United States Patent
Wenning et al.

(10) Patent No.: US 7,026,393 B2
(45) Date of Patent: Apr. 11, 2006

(54) POLYURETHANE POWDER COATINGS WITH A MATT APPEARANCE

(75) Inventors: Andreas Wenning, Nottuln (DE); Jörn Volker Weiss, Haltern am See (DE)

(73) Assignee: Degussa AG, Duesseldorf (DE)

( * ) Notice: Subject to any disclaimer, the term of this patent is extended or adjusted under 35 U.S.C. 154(b) by 106 days.

(21) Appl. No.: 10/621,386

(22) Filed: Jul. 18, 2003

(65) Prior Publication Data

US 2004/0024114 A1    Feb. 5, 2004

(30) Foreign Application Priority Data

Jul. 20, 2002    (DE)    ................ 102 33 103

(51) Int. Cl.
  *C08J 3/00* (2006.01)
  *C08K 3/20* (2006.01)
  *C08L 75/00* (2006.01)
  *C08F 20/00* (2006.01)

(52) U.S. Cl. ............ 524/590; 524/589; 525/440; 525/452; 525/934

(58) Field of Classification Search ......... 524/589, 524/590; 525/440, 452, 934
See application file for complete search history.

(56) References Cited

U.S. PATENT DOCUMENTS 6,710,136 B1 *   3/2004   Grenda et al. ............ 525/440
2002/0045717 A1 *  4/2002   Grenda et al. ............ 525/453

FOREIGN PATENT DOCUMENTS

| DE | 196 30 844 | 2/1998 |
|----|-----------|--------|
| DE | 100 42 318 | 3/2002 |
| EP | 0 372 958 | 6/1990 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Polyurethane powder coating materials comprising polyureas, polyesters, and crosslinkers, which have less than 15 mol % succinic acid as the polycarboxylic acid component. Matt coatings and coated materials comprising or produced using such polyurethane powder coating materials.

28 Claims, No Drawings

POLYURETHANE POWDER COATINGS WITH A MATT APPEARANCE

CROSSREFERENCE TO RELATED APPLICATIONS

This application is related to, and claims priority from, German patent application 10233103.0, filed Jul. 20, 2002.

BACKGROUND OF THE INVENTION (1) Field of the Invention

Polyurethane powder coating materials comprising polyureas, polyesters, and crosslinkers, having less than 15 mol % succinic acid as the polycarboxylic acid component. These powder coating materials have outstanding properties, especially in the context of producing matt coatings.

(2) Description of the Related Art

Coating materials are used widely to provide decorative and utilitarian properties, such as to improve the durability of a material or other useful functional properties, such as stain, solvent and chemical resistance. Coatings are used in a variety of industrial, commercial or consumer products, including in architectural and building materials and in consumer goods and appliances. For a long time there has been increasing interest in powder coating materials which produce a matt surface. Practical reasons drive this interest: among them the higher degree of cleaning and maintenance required by glossy surfaces compared to matt surfaces and safety considerations for applications involving the need to avoid strongly reflecting surfaces. Additionally, the aesthetic properties of a matt surface are demanded for certain applications.

The easiest way to obtain a matt surface is to admix smaller or larger amounts of fillers, such as chalk, finely divided silica or barium sulfate, to the powder coating material in accordance with the extent of the desired matt effect. However, such additions bring about deterioration in the film properties of the coating, such as adhesion, flexibility, impact strength, and chemical resistance.

The addition of substances incompatible with the coating material, such as waxes or cellulose derivatives, does give rise to matting, but slight changes in the course of extrusion lead to fluctuations in the surface gloss. Therefore, the reproducibility of the matt effect is not ensured.

Polyisocyanates containing urea and uretdione groups have become known only in relatively recent times. DE-A 195 46 750 claims reaction products of isophorone diisocyanate uretdione and disecondary diamines as curing agents for producing polyurethane coatings having glossy surfaces.

DE-A 196 30 844 was the first to describe matt polyurethane powder coating materials which comprise as their curing component isophorone diisocyanate uretdiones containing urea groups. They are prepared by reacting uretdiones with water. Intermediates which form during this reaction, with the elimination of carbon dioxide, are primary amines, which react with remaining isocyanate groups to form ureas. The nitrogen atoms of the urea groups are each monosubstituted. Reactions of polyisocyanates with water are difficult to reproduce owing to the formation of by-products.

DE-A 196 37 375 describes polyurethane powder coating materials which are formulated for a matt effect by means of isophorone diisocyanate uretdiones containing urea groups as curing agents. These curing agents are formed by the reaction of isophorone diisocyanate uretdione with disecondary diamines. The disecondary diamines are reaction products of diprimary diamines and maleic or fumaric esters.

DE-A 196 37 377 and DE-A 19816 547 claim polyaddition products containing uretdione groups and urea groups as a curing component for the matting of polyurethane powder coating materials. These curing agents are prepared by reacting isophorone diisocyanate uretdione with diamines having one primary and secondary amino groups. Preparation of the pure diamines is in some cases complex and very costly.

DE 100 42 318 describes novel matt polyurethane powder coating materials which are easy to prepare, with the powder coatings produced from them having good mechanical properties. Matting is brought about by a combination of a polyurea with a polyester that contains succinic acid. As a result, the range of polyesters which can be used is limited.

BRIEF SUMMARY OF THE INVENTION

It was an object of the invention to find novel polyurethane powder coating materials which lead to matt coatings. The powder coatings produced from them ought to be at the same high level in terms of their mechanical properties.

This object has been achieved by the polyurethane powder coating materials of the invention. It was surprising that by combining polyurea and polyesters which contained no, or less than 15 mol % of, succinic acid as polycarboxylic acid component it was possible to obtain polyurethane powder coating materials having outstanding properties, especially in the context of matt coatings.

DETAILED DESCRIPTION OF THE INVENTION

The invention provides polyurethane powder coating materials comprising:

A) 3–25% by weight of polyurea;
B) 35–75% by weight of at least one amorphous and/or (semi)crystalline polyester synthesized from at least one polyol and at least one polycarboxylic acid and/or their esters and/or anhydrides having an OH number of 5–250 mg KOH/g and a melting point of from 50 to 130° C.;
C) 5–30% by weight of at least one curing agent based on blocked polyisocyanates, isocyanurates and/or uretdiones having a functionality of at least 2;
D) 0.5–50% by weight of auxiliaries and additives;

the fraction of succinic acid or its anhydride in component B) being less than 15 mol % and there being from 0.5 to 1.2 NCO groups of component C) available per OH group of component B).

The ranges described above include all intermediate values and subranges within each range. For instance, the weight range for (A) 3–25%, includes values such as 3, 3.5, 4, 5, 6, 10, 12.5, 13, 15, 17.5, 20, 22.5 and 25%; (B) includes values such as 35, 35.5, 36, 37, 38, 39, 40, 42.5, 45, 47.5, 50, 55, 60, 65, 70, 72.5, 74 and 75%; (C) Includes values such as 5, 5.25, 5.5, 6, 7, 7.5, 10, 12.5, 13, 15, 17.5, 20, 22.5, 24, 25, 27.5, 28, 29 and 30% and (D) includes values such as 0.5, 0.75, 1, 1.25, 1.5, 2, 3, 4, 5, 7.5, 10, 12.5, 15, 20, 25, 30, 35, 40, 45, 47.5, 48, 49, 49.5 and 50.

The polyurethane powder coating materials of the invention contain 3–25% by weight of polyurea. Customarily, the polyureas are synthesized from at least one at least difunctional amine with isocyanate in an $NCO/NH_2$ ratio of from 0.9 to 1.1:1.

Polyureas are known and are described, for example, in:
Houben-Weyl E 20/2 (1987) pages 1721–1751;
Houben-Weyl XIV/2 (1963) pages 165–171.

In the context of the invention it is possible to use any brittle, high-melting polyureas, e.g., those formed from aliphatic, (cyclo)aliphatic, cycloaliphatic and aromatic diamines and/or polyamines ($C_5$–$C_{18}$) and from the corresponding, or else different, isocyanates (as diisocyanates and their oligomers, e.g., isocyanurates). The term $C_5$–$C_{18}$ includes each intermediate value within this range, e.g., $C_6$, $C_{10}$, $C_{15}$, and $C_{17}$.

Particularly suitable diisocyanates and/or isocyanurates are those of isophorone diisocyanate (IPDI), hexamethylene diisocyanate (HDI), and 4,4'-dicyclo-hexylmethane diisocyanate (HMDI).

One preferred embodiment of the invention is the use of polyureas based on nonaromatic amines and isocyanates, such as isophoronediamine (IPD) and isophorone diisocyanate (IPDI) and/or HDI, it being possible to employ the diisocyanate alone, as isocyanurate, and the mixtures of this kind. The polyureas used with preference in the context of this specification are described in DE 100 42 322 and are part of the disclosure content of this specification.

Component B) comprises amorphous and/or (semi)crystalline polyesters.

It is essential to the invention that polyester B) is synthesized from less than 15 mol % of succinic acid. For instance, polyester B) may be produced from 14, 12, 10, 7.5, 5, 3, 2, 1 or 0 mol % succinic acid.

The amorphous polyesters B) have a functionality of from 2.0 to 5.0, preferably from 2.0 to 4.2. The functionality value includes all subranges and intermediate values, for instance, 2.1, 2.2, 2.3, 2.5, 2,75, 3.0, 3.25, 3.5, 3.75, 4.0, 4.25, 4.5, 4.75 and 4.9. The amorphous polyesters B) have an OH number of from 5 to 250 mg KOH/g, in particular from 20 to 250 mg KOH/g. This range includes all intermediate values and subranges, e.g. 6, 10, 15, 25, 30, 35, 40, 45, 50, 60, 70, 80, 90, 100, 120, 150, 175, 200, 210, 225 and 249. It has a viscosity at 160° C. of <60,000 mPa·s, a melting point of from 50° C. to 130° C., preferably from 70 to 120° C., and a glass transition temperature of >40° C. These ranges also include all intermediate values and subranges. For instance, the viscosity at 160° C. of <60,000 mPa·s may be 59,000, 55,000, 50,000, 40,000, or 30,000. The melting point may be 50, 51, 52.5, 60, 70, 75, 80, 85, 90, 100, 105, 110, 120, 125, 129 or 130° C. or any subrange within 50° C. to 130° C. The glass transition temperature may be any temperature >40° C., for instance, 41, 42, 45, 50, 60 or 70° C.

The (semi)crystalline polyesters B) have a functionality of from 2.0 to 4.0, an OH number of from 5 to 250 mg KOH/g, in particular from 5 to 150 mg KOH/g, a melting point of from 50° C. to 130° C., and a glass transition temperature of <–10° C. As described for amorphous polyesters above, these values include all intermediate values and subranges.

In principle, all known linear and/or branched polyols and polycarboxylic acids and/or their esters and/or their anhydrides are suitable in the context of the invention for preparing the polyester B). Suitable polyols are described, for example, in DE 27 35 497 and DE 30 04 903. Suitable polycarboxylic acids are described, for example, in DE 101 59 488.

Polyols used with preference are monoethylene glycol, diethylene glycol, neopentyl glycol hydroxypivalate, butane-1,4-diol, pentane-1,2-diol, pentane-1,5-diol, hexane-1,6-diol, dodecane-1,12-diol, cyclohexanediol, neopentyl glycol, 1,4-bis(hydroxymethyl)cyclohexane, trimethylolpropane, glycerol, and pentaerythritol.

Carboxylic acids and/or their esters and/or their anhydrides that are used with preference are terephthalic acid, isophthalic acid, phthalic acid, adipic acid, azelaic acid, succinic acid, sebacic acid, dodecanedioic acid, hexahydroterephthalic acid, hexahydrophthalic acid, 1,4-cyclohexanedicarboxylic acid, trimellitic acid, and pyromellitic acid.

The polyesters may be obtained conventionally by condensing polyols and polycarboxylic acids in an inert gas atmosphere at temperatures from 100 to 260° C., preferably from 130 to 220° C., in the melt or in an azeotropic regime, as described, for example, in Methoden der Organischen Chemie (Houben-Weyl), Vol. 14/2, 1–5, 21–23, 40–44, Georg Thieme Verlag, Stuttgart, 1963, in C. R. Martens, Alkyd Resins, 51–59, Reinhold Plastics Appl. Series, Reinhold Publishing Comp., New York, 1961 or in DE 27 35 497 and DE 30 04 903.

As curing agents C) based on polyisocyanates it is possible in principle to use the known curing agents in the field of powder coating materials. It is preferred to use polyisocyanates containing blocking agents and also internally blocked polyisocyanates. They are described, for example, in DE 21 05 777, 25 42 191, 27 35 497, 30 39 824, 30 30 572, 30 30 513, 37 39 549, 101 59 768, and 101 59 488.

Accordingly, the powder coating materials of the invention may comprise curing agents C) based on blocked polyisocyanates, blocked isocyanurates, and uretdiones, alone or in mixtures. The starting components are preferably selected from IPDI, HDI, and HMDI.

Blocking agents which can be used are well known in the art. Preference is given to using caprolactam, triazoles, oximes and/or pyrazoles.

The ratio of resin (component B) to crosslinker (component C) is chosen such that there are from 0.5 to 1.2, preferably 0.8–1.0, NCO groups available per OH group of the resin. These ranges include all intermediate values and subranges, e.g. 0.6, 0.7, 0.75, 0.8, 0.9, 1.0 and 1.1.

The auxiliaries and additives D) present in the polyurethane powder coating materials of the invention are, for example, one or more leveling agents, pigments, fillers, dyes, catalysts, light stabilizers, heat stabilizers, antioxidants and/or effect additives. They are normally present in amounts of 0.5–50% by weight, for instance, 1, 2, 3, 5, 10, 20, 25, 30, 40, 45 or 49%.

To prepare the ready-to-use powder coating materials, components A), B), C), and D) are homogenized in the melt. This can be done in suitable apparatus, such as in heatable kneaders, but preferably by extrusion, during which temperature limits of 130 to 140° C. ought not to be exceeded. The extruded homogenized mass is cooled to room temperature, comminuted appropriately, ground to the ready-to-spray powder, and sieved off to a particle size <100 µm.

The polyurethane powder coating materials of the invention are outstandingly suitable for producing coatings having a matt appearance.

The invention provides for the use of polyurethane powder coating materials comprising
A) 3–25% by weight of polyurea;
B) 35–75% by weight of at least one amorphous and/or (semi)crystalline polyester synthesized from one or more polyols and polycarboxylic acids and/or their esters and/or anhydrides having an OH number of 5–250 mg KOH/g and a melting point of from 50 to 130° C.;
C) 5–30% by weight of at least one curing agent based on blocked polyisocyanates, isocyanurates and/or uretdiones having a functionality of at least 2;

D) 0.5–50% by weight of auxiliaries and additives;

the fraction of succinic acid or its anhydride in component B) being less than 15 mol % and there being from 0.5 to 1.2 NCO groups of component C) available per OH group of component B), to produce coatings having a matt appearance.

Depending on intended application, these matt coatings of the invention have degrees of gloss of less than 70 at a 60° angle, for instance, the degree of gloss may be any value below 70 such as <10, 10, <15, 15, 20, 25, 30, 35, 40, 45, 50, 55, 60, 65, 67.5, 69 or 70.

Application of the ready-to-spray powder to suitable substrates to produce matt coatings can take place in accordance with the known methods, such as electrostatic powder spraying and fluid-bed sintering with or without electrostatic assistance. While such methods are well known in the art, incorporation by reference is made to the *Kirk-Othmer Encyclopedia of Chemical Technology*, 4$^{th}$ edition (1993), especially to volume 6, pages 606–746 (Coating Processes, Coatings). Following powder application, the coated workpieces are cured conventionally by heating in an oven at a temperature of from 160 to 250° C. for from 60 minutes to 30 seconds, preferably at from 170 to 240° C. for from 30 minutes to 1 minute.

The subject matter of the invention is illustrated below with reference to examples.

A) Polyurea

EXAMPLE 1

The polyurea (PH) was composed of 36% by weight isophoronediamine (IPD), 31% by weight isophorone diisocyanate (IPDI), and 32% by weight IPDI isocyanurate. The product was white, brittle, and insoluble in customary solvents. Decomposition occurred above 250° C.

B) Polyesters

EXAMPLE 1

The composition of the polyester was as follows: as acid component 100 mol % dodecanedioic acid; as alcohol component 100 mol % hexane-1,6-diol. The polyester had an OH number of 29 mg KOH/g, an acid number of 1 mg KOH/g, and a melting point of 55° C.

EXAMPLE 2

The composition of the polyester was as follows: as acid components 93 mol % terephthalic acid, 2.5 mol % isophthalic acid, 4.5 mol % adipic acid; as alcohol components 88 mol % neopentyl glycol, 4 mol % pentane-1,2-diol, 8 mol % trimethylolpropane. The polyester had an OH number of 47 mg KOH/g, an acid number of 7.0 mg KOH/g, and a glass transition temperature of 56° C.

C) Preparation of Blocked Isocyanate Component

EXAMPLE 1

699.8 g of Desmodur N 3300 (polyisocyanato isocyanurate based on hexamethylene diisocyanate, from Bayer) and 1632.8 g of VESTANAT T 1890 (polyisocyanato isocyanurate based on isophorone diisocyanate from Degussa) were heated to 100° C. 3.5 g of dibutyltin dilaurate were added. Then 1163.9 g of ε-caprolactam were added in portions. An hour after the final portion of ε-caprolactam, the reaction was at an end. The reaction mixture was subsequently cooled to room temperature. The reaction product had a free NCO group content of 0.4%, a total NCO content of 12.0%, and a melting range of 88–91° C.

D) Polyurethane Powder Coating Materials

General Preparation Procedure

The comminuted products—blocked polyisocyanate (crosslinker), polyesters, leveling agent, devolatilizer, and catalyst masterbatch—are intimately mixed with white pigment in an edge runner mill and then homogenized in an extruder at up to 130° C. After cooling, the extrudate is fractionated and ground with a pinned disc mill to a particle size <100 μm. The powder thus prepared is applied to degreased, iron-phosphatized steel panels using an electrostatic powder spraying unit, and the coated panels are baked in a forced air oven.

The formulations contained 25% by weight Kronos 2160 (titanium dioxide from Kronos), 1% by weight Resiflow PV 88 (leveling agent from Worlée-Chemie), 0.5% by weight benzoin (devolatilizer from Merck-Schuchardt) and 0.1% by weight dibutyltin dilaurate (catalyst from Crompton Vinyl Additives GmbH). The OH/NCO ratio was 1:1.

TABLE 1

Data of matt polyurethane powder coating materials with white pigmentation

| | | | |
|---|---|---|---|
| Polyurea A) | 10.0 g A) 1 | 20.0 g A) 1 | — |
| Polyesters B) | 10.0 g B) 1 | 12.7 g B) 1 | 11.6 g B) 1 |
| | 39.9 g B) 2 | 29.7 g B) 2 | 46.2 g B) 2 |
| Isocyanate C) | 13.5 g C) 1 | 11.0 g C) 1 | 15.6 g C) 1 |
| Baking conditions | 200° C./12 min | 200° C./12 min | 200° C./12 min |
| Film thickness (μm) | 60–70 | 65–72 | 71–78 |
| Gloss 60° | 65 | 45 | 90 |
| Cupping (mm) | >10 | >10 | >10 |
| BI dir./indir. (inch 1b) | >80/80 | >80/>80 | >80/>80 |
| Remark | | | Comparative |

The abbreviations in the table have the following meanings:
Gloss 60° = Gardner gloss measurement (ASTM-D 5233)
Cupping = Erichsen cupping (DIN 53 156)
BI dir./indir. = direct and indirect ball impact (ASTM D 2794-93)

The invention encompasses products, such as powders useful for producing matt coatings, as well as uncured and cured matt coatings produced with the above products. Products, including industrial and commercial products, comprising such coatings are also contemplated. For instance, building and construction materials or materials used to manufacture machines, including vehicles. Methods of making industrial, commercial or consumer products by applying the products of the invention to an object or surface by conventional means are also contemplated.

Modifications and Other Embodiments

Various modifications and variations of the described products, compositions and methods as well as the concept of the invention will be apparent to those skilled in the art without departing from the scope and spirit of the invention. Although the invention has been described in connection with specific preferred embodiments, it should be understood that the invention as claimed is not intended to be limited to such specific embodiments. Various modifications of the described modes for carrying out the invention which are obvious to those skilled in the chemical, chemical engineering, polymer, coating and manufacturing arts or related fields are intended to be within the scope of the following claims.

INCORPORATION BY REFERENCE

Each document, patent application or patent publication cited by or referred to in this disclosure is incorporated by reference in its entirety. Any patent document to which this application claims priority is also incorporated by reference in its entirety. Specifically, priority document German patent application 10233103.0, filed Jul. 20, 2002 is hereby incorporated by reference.

What is claimed is:

1. A polyurethane powder coating material, comprising:
   A) 3–25% by weight of polyurea;
   B) 35–75% by weight of at least one amorphous and/or (semi)crystalline polyester synthesized from at least one polyol and at least one polycarboxylic acid, of which one is succinic acid or its anhydride, and/or their ester(s) and/or anhydride(s) having an OH number of 5–250 mg KOH/g and a melting point ranging from 50 to 130° C.;
   C) 5–30% by weight of at least one curing agent based on blocked polyisocyanate(s), blocked isocyanurate(s) and/or uretdiones having a functionality of at least 2;
   D) 0.5–50% by weight of at least one auxiliary(ies) and/or additive(s);
the fraction of succinic acid or its anhydride in component B) ranging from 1 to 14 mol % and there being from 0.5 to 1.2 NCO groups of component C) available per OH group of component B).

2. The coating material of claim 1, wherein the polyurea A) is composed of at least one at least difunctional isocyanate and at least one at least difunctional amine and has an NCO/NH$_2$ ratio of 0.9–1.1:1.

3. The coating material of claim 1, wherein the polyurea is composed of an isocyanate and/or isocyanurate.

4. The coating material of claim 1, wherein the isocyanate or isocyanurate is selected from the group consisting of IPDI, HDI, HMDI, and a mixture of two or more thereof.

5. The coating material of claim 1, wherein the polyurea comprises an aliphatic, cycloaliphatic, and/or aromatic diamine(s) and/or polyamine(s) having 5–18 carbon atoms.

6. The coating material of claim 5, that comprises IPD as the amine.

7. The coating material of claim 1, wherein component B) is an amorphous polyester.

8. The coating material of claim 7, wherein the polyester B) has a functionality ranging from 2.0 to 5.0, an OH number ranging from 5 to 250 mg KOH/g, a viscosity at 160° C. of <60,000 mPa·s, and a melting point ranging from 50° C. to 130° C.

9. The coating material of claim 1, wherein component B) is a (semi)crystalline polyester.

10. The coating material of claim 1, wherein the polyester has a functionality ranging from 2.0 to 4.0, an OH number ranging from 5 to 250 mg KOH/g, a melting point ranging from 50° C. to 130° C., and a glass transition temperature of <-0° C.

11. The coating material of claim 1, wherein the polyester B) is synthesized from at least one of the following polyols:
   monoethylene glycol, diethylene glycol, neopentyl glycol hydroxypivalate, butane-1,4-diol, pentane-1,2-diol, pentane-1,5-diol, hexane-1,6-diol, dodecane-1,12-diol, cyclohexanediol, neopentyl glycol, 1,4-bis(hydroxymethyl)cyclohexane, trimethylolpropane, glycerol or pentaerythritol.

12. The coating material of claim 1, wherein the polyester B) is synthesized from at least one of the following acids and/or esters and/or anhydrides:
   terephthalic acid, isophthalic acid, phthalic acid, adipic acid, azelaic acid, succinic acid, sebacic acid, dodecanedioic acid, hexahydroterephthalic acid, hexahydrophthalic acid, 1,4-cyclohexanedicarboxylic acid, trimellitic acid or pyromellitic acid.

13. The coating material of claim 1, comprising a curing agent(s) C) based on blocked polyisocyanates, blocked isocyanurates and/or uretdiones as the diisocyanates IPDI, HDI and/or HMDI.

14. The coating material of claim 1, wherein the curing agent C) has been blocked with at least one blocking agent selected from the group consisting of caprolactam, triazoles, oximes and pyrazoles.

15. The coating material of claim 1, wherein D) comprises at least one leveling agent(s), pigment(s), filler(s), dye(s), catalyst(s), light stabilizer(s), heat stabilizer(s), antioxidant(s) or effect additive(s).

16. The coating material of claim 1, wherein the content of succinic acid is no more than 12 mol %.

17. The coating material of claim 16, wherein the content of succinic acid is no more than 10 mol %.

18. A method for applying a coating to a material to be coated, comprising contacting said material with the polyurethane powder coating material of claim 1 under conditions suitable for formation of a coating on said material to be coated.

19. The method of claim 18, wherein said coating is produced by a method that comprises electrostatic powder spraying.

20. The method of claim 18, wherein said coating is produced by a method that comprises fluid-bed sintering with or without electrostatic assistance.

21. The method of claim 18, that comprises curing the polyurethane powder coating material by the application of heat to form a cured coating.

22. The method of claim 18, wherein a matt coating is produced.

23. The method of claim 18, wherein said material to be coated is an architectural material.

24. The method of claim 18, wherein said material to be coated comprises metal.

25. A coating produced from the powder of claim 1.

26. A coating having a matt appearance that is produced using the powder of claim 1.

27. The coating of claim 26, wherein said coating has a degree of gloss of less than 70 at a 60 ° angle.

28. A coated industrial, commercial or consumer product that comprises the coating material of claim 1, or the coating material of claim 1 that has been cured.

* * * * *